United States Patent Office 3,166,568
Patented Jan. 19, 1965

3,166,568
4,4-DISUBSTITUTED 3-PYRAZOLIDINONES AND THERAPEUTIC COMPOSITIONS CONTAINING THE SAME
Bruno J. R. Nicolaus, Milan, Italy, and Emilio Testa, Vacallo, Tessin, Switzerland, assignors to Lepetit S.p.A., Milan, Italy
No Drawing. Filed Apr. 2, 1962, Ser. No. 184,540
Claims priority, application Great Britain, Apr. 14, 1961, 13,586/61
4 Claims. (Cl. 260—310)

This invention is concerned with new pharmacologically active compounds. More particularly the invention relates to 4-substituted 3-pyrazolidinones of the general formula:

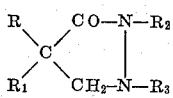

wherein R represents an alkyl, aryl or aralkyl radical, $R_1$ represents an alkyl radical having at least 2 carbon atoms, or an aryl or aralkyl radical and $R_2$ and $R_3$ represent hydrogen or alkyl, aryl or aralkyl radicals; and a process for preparing the same. The above compounds are active as antiphlogistics and on the central nervous system.

The process for the preparation of the new 3-pyrazolidinones essentially consists in the following steps: (1) opening of the lactone ring of α-substituted β-propionolactones with hydracids, giving the corresponding α-substituted β-halopropionic acids, (2) conversion of the carboxyl group into the corresponding alkyl ester or acyl chloride and (3) reaction of the α-substituted β-haloacid esters or chlorides with hydrazine or its derivatives.

The reaction scheme is as follows:

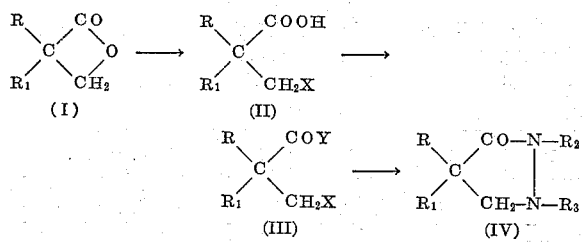

wherein R, $R_1$ $R_2$, $R_3$ have the above significance, X is halogen and Y represents chlorine or an alkoxy group.

The synthesis of the compounds of formula II is carried out by reacting an α,α-disubstituted β-propionolactone with the selected hydracid, preferably in an inert organic solvent. For practical purposes, the preparation can, for example, be carried out by dissolving in an inert organic solvent, such as glacial acetic acid, the α,α-disubstituted β-hydroxypropionic acid lactone, adding the mixture to a solution of the hydracid in the same solvent or in a solvent miscible with the same, allowing the mixture to stand at room temperature and then heating the same to complete reaction.

From the reaction mixture the compound is then isolated by usual methods, for example by evaporating the reaction solvent to dryness and working up the residue. α,α-disubstituted β-halopropionic acids are useful intermediates not only for the preparation of pyrazolidinones, which are the primary object of the present application, but also for the production of new penicillins from 6-aminopenicillanic acid.

These latter penicillins forming the subject of our copending application S.N. 184,539, filed simultaneously herewith, show a high degree of activity against penicillinase-producing strains of microorganisms and possess a considerable degree of stability to acids, thus allowing oral therapy with penicillins also in infectious diseases due to penicillin-resistant strains.

The conversion into the corresponding acid halides or esters is carried out as usual, for example, by treating the acid either with thionyl chloride, if the acid chloride is desired, or with an alcohol in the presence of a catalyst if the ester is to be prepared.

The α,α-disubstituted β-halopropionic acid halide or ester is then reacted with the selected hydrazine, if desired, in excess, in the presence or not of an organic solvent and in the presence of a proton acceptor which may be the same hydrazine if sufficiently basic. Depending upon the nature of the used hydrazine, which can be unsubstituted, mono- or 1,2-disubstituted, there are obtained disubstituted, trisubstituted or tetrasubstituted 3-pyrazolidinones. These latter tetrasubstituted 3-pyrazolidinones can also be obtained starting from di- or trisubstituted 3-pyrazolidinone and introducing the desired substituent at the nitrogen atom by conventional alkylation methods.

The following non-limiting examples illustrate the invention.

Example 1.—4-phenyl-4-n-butyl-3-pyrazolidinone

A stream of gaseous anhydrous HBr is bubbled into 100 ml. of glacial acetic acid at room temperature, completing the saturation at 0–5° C. Then 20.4 g. of α-phenyl-α-n-butyl-β-propiolactone is added dropwise under stirring and the temperature is allowed to reach 10–20° C. The mixture is kept at room temperature for two hours and then heated at 80° C. for 2 hours. The acetic acid is evaporated in vacuo and the oily residue is taken up with ethyl ether. The ether layer is washed with small portions of water to neutral Congo red reaction, dried over sodium sulphate and filtered. The distilled residue gives in good yield α-phenyl-α-n-butyl-β-bromopropionic acid, M.P. 100–102° C., which is converted into the corresponding chloride.

To 12 g. of crude α-phenyl-α-n-butyl-β-bromopropionyl chloride in 50 ml. of anhydrous ethyl alcohol, 5.5 g. of triethylamine are added and the mixture is allowed to stand at room temperature overnight. Then it is heated for a short time, cooled, filtered and the solvent removed in vacuo. The residue is taken up with diethyl ether, washed with dilute HCl, then with water, dried over $Na_2SO_4$, filtered and the solvent removed to give ethyl α-phenyl-α-n-butyl-β-bromo-propionate; B.P. 135° C./1 mm. Hg.

A mixture of 9.5 g. of ethyl α-phenyl-α-n-butyl-β-bromo-propionate and 27 g. of anhydrous hydrazine is refluxed 18 hrs. Then the excess $NH_2NH_2$ is distilled in vacuo, the residue is taken up with diethyl ether, filtered and the solvent distilled to give 4-phenyl-4-butyl-3-pyrazolidinone; B.P. 170–175° C./0.2 mm. Hg.

Example 2.—4-phenyl-4-benzyl-3-pyrazolidinone

Two hundred and fifty millilitres of glacial acetic acid are saturated with gaseous HBr and 59.5 g. of α-phenyl-α-benzyl-β-propiolactone are added dropwise under stirring. The mixture is allowed to stand 2 hours at room temperature and then heated at 80° C. for 2 hours. The acetic acid is evaporated in vacuo and the oily residue is taken up with $H_2O$ and ethyl ether. The ether solution, separated from the aqueous phase, is washed with small amounts of water to neutrality to Congo red, dried over $Na_2SO_4$, filtered and the solvent evaporated. The residue recrystallized from ligroin gives α-phenyl-α-benzyl-β-bromopropionic acid; M.P. 170–172° C. A mixture of 32 g. of α-phenyl-α-benzyl-β-bromopropionic acid and 23.8 g. of thionyl chloride is heated till the evolution of gas subsides, i.e. for about 2 hours. The excess reactant is then evaporated in vacuo and the oily residue so obtained is taken up with 100 ml. of absolute ethyl alcohol. Then 11.2 g. of triethylamine are added and the mixture is allowed to stand overnight at room temperature. The mixture is refluxed for 10 minutes, cooled, the precipitated triethylamine hydrochloride is filtered and the alcohol is distilled off in vacuo. The residue is taken up with ether, the solution is washed first with dilute HCl and then with water, dried over $Na_2SO_4$ and filtered. The ether is removed in vacuo and ethyl α-phenyl-α-benzyl-β-bromopropionate is obtained in good yield; B.P. 158–160° C./0.4 mm. Hg.

The obtained bromoester (8.8 g.) is refluxed 18 hours with 2.5 g. of anhydrous hydrazine. The excess hydrazine is removed and the residue, recrystallized from ligroin, gives 4-phenyl-4-benzyl-3-pyrazolidinone; M.P. 164–166° C.

*Examples 3–9*

According to the procedure described in the preceding examples the following 3-pyrazolidinones were prepared:

| R | $R_1$ | $R_2$ | $R_3$ | M.P.,° C. | B.P. |
|---|---|---|---|---|---|
| $C_2H_5$ | $C_2H_5$ | H | H |  | 120–125° C./0.2 mm. Hg. |
| n—$C_3H_7$ | n—$C_3H_7$ | H | H |  | 165–170° C./0.6 mm. Hg. |
| n—$C_4H_9$ | n—$C_4H_9$ | H | H |  | 135–145° C./0.6 mm. Hg. |
| $C_6H_5$ | $CH_3$ | H | H | 125–127 |  |
| $C_6H_5$ | $C_2H_5$ | H | H | 105–107 |  |
| $C_6H_5$ | n—$C_3H_7$ | H | H |  | 175–180° C./0.4 mm. Hg. |
| $C_6H_5$ | $C_6H_5$ | H | H | 165–167 |  |

*Example 10.—1,4-diphenyl-4-butyl-3-pyrazolidinone*

A mixture of 20 g. of α-phenyl-α-butyl-β-bromopropionic acid prepared substantially as described hereinbefore and 30 ml. of thionyl chloride is refluxed for 3 hours. The excess $SOCl_2$ is removed in vacuo. The obtained 21.7 g. of acyl chloride are dissolved in 71 ml. of anhydrous ether, and a solution of 7.3 g. of diphenylhydrazine, 17.6 g. of triethylamine and 14.0 ml. of anhydrous ether is added dropwise. The mixture is stirred for 30 minutes at 0° C. and refluxed for 1 hour. After cooling, the triethylamine salt so formed is filtered off, the ether solution is washed with dilute HCl, water, a sodium bicarbonate solution and again with water. The solution is dried over $CaSO_4$, the solvent is evaporated and the residue is crystallized from petroleum ether. 1,4-diphenyl-4-butyl-3-pyrazolidinone melting at 83–85° C. is obtained in good yield.

*Examples 11–18*

According to the procedure described in Example 10 the following derivatives were prepared:

| R | $R_1$ | $R_2$ | $R_3$ | M.P. or B.P. |
|---|---|---|---|---|
| n—$C_4H_9$ | n—$C_4H_9$ | H | $C_6H_5$ | 180–190° C./0.2 mm. Hg. |
| n—$C_3H_7$ | n—$C_3H_7$ | H | $C_6H_5$ | 80–81° C. |
| $C_6H_5$ | $CH_3$ | H | $C_6H_5$ | 123–124° C. |
| $C_6H_5$ | $C_2H_5$ | H | $C_6H_5$ | 113–115° C. |
| $C_6H_5$ | n—$C_3H_7$ | H | $C_6H_5$ | 72–74° C. |
| $C_6H_5$ | $C_6H_5CH_2$— | H | $C_6H_5$ | 113–115° C. |
| $C_6H_5$ | $C_6H_5$ | H | $C_6H_5$ | 151–152° C. |
| $C_2H_5$ | $C_2H_5$ | H | $C_6H_5$ | 148–150° C. |

*Example 19.—1-methyl-4,4-diethyl-3-pyrazolidinone*

To a solution of 0.5 g. of sodium in 30 ml. of ethyl alcohol 2.84 g. of 4,4-diethyl-3-pyrazolidinone are added with stirring until the solution is complete. Then 2.77 g. of dimethyl sulphate are added dropwise. The mixture is refluxed for 1 hour, the solvent is evaporated and the residue extracted with ether to remove some by-products. Then it is dissolved in anhydrous acetone, filtered, and the remaining oil is distilled; 1-methyl-4,4-diethyl-3-pyrazolidinone is obtained; B.P. 140–150° C./0.4 mm. Hg.

*Example 20.—1-methyl-4-phenyl-4-ethyl-3-pyrazolidinone*

Three and eight tenths grams of sodium are dissolved in 250 ml. of absolute ethyl alcohol and 28.5 g. of 4-phenyl-4-ethyl-3-pyrazolidinone and 21 g. of dimethyl sulphate are added dropwise keeping the temperature between 10 and 20° C. The mixture is refluxed for 1 hour, the solvent is evaporated and the residue treated with warm ethyl ether. The inorganic salts are filtered off and the solution is washed with water and dried over $CaSO_4$. 1-methyl-4-phenyl-4-ethyl-3-pyrazolidinone is obtained, B.P. 160–170° C./0.2 mm. Hg.

*Example 21.—1-phenyl-2-methyl-4,4-diethyl-3-pyrazolidinone*

Into a solution of 1.6 g. of sodium hydroxide in 30 ml. of water 2.8 g. of 1-phenyl-4,4-diethyl-3-pyrazolidinone are dissolved. Then 1.83 g. of dimethyl sulphate are added dropwise under stirring at room temperature for 30 minutes. The mixture is heated for 1 hour at 50° C., cooled, extracted wth ethyl ether, and the oil obtained by evaporation of the solvent is distilled in vacuo. 1-phenyl-2-methyl-4,4-diethyl-3-pyrazolidinone is obtained, B.P. 150–160° C./0.2 mm. Hg, M.P. 60–61° C. (from isopropyl ether).

*Example 22.—1-phenyl-2-methyl-4-phenyl-4-ethyl-3-pyrazolidinone*

A mixture of 5.26 g. of 1-phenyl-4-phenyl-4-ethyl-3-pyrazolidinone, 6.9 g. of potassium hydroxide and 7.1 g. of methyl iodide in 50 ml. of acetone is refluxed for 8 hours. The inorganic salt is filtered off and the solvent is evaporated. The residue is dissolved in ethyl ether, the ether solution is washed with water, dried and the solvent evaporated. The oily residue is purified by distillation in vacuo. The product distils at 170–180° C./0.2 mm. Hg.

*Examples 23–33*

Substantially as described in the preceding examples the following 1,2,4,4-tetrasubstituted 3-pyrazolidinones were prepared:

| R | $R_1$ | $R_2$ | $R_3$ | M.P. or B.P. |
|---|---|---|---|---|
| n—$C_3H_7$ | n—$C_3H_7$ | $CH_3$ | $C_6H_5$ | 165–170° C./1.5 mm. Hg. |
| $C_6H_5$ | $CH_3$ | $CH_3$ | $C_6H_5$ | 160–165° C./0.5 mm. Hg. |
| $C_6H_5$ | n—$C_3H_7$ | $CH_3$ | $C_6H_5$ | 165–175° C./0.5 mm. Hg. |
| $C_6H_5$ | n—$C_4H_9$ | $CH_3$ | $C_6H_5$ | 175–180° C./0.5 mm. Hg. |
| $C_6H_5$ | $C_6H_5CH_2$— | $CH_3$ | $C_6H_5$ | 115–116° C. |
| $C_6H_5$ | $C_6H_5$ | $CH_3$ | $C_6H_5$ | 220–230° C./0.8 mm. Hg. |
| $C_6H_5$ | $C_2H_5$ | $C_2H_5$ | $C_6H_5$ | 150–160° C./0.6 mm. Hg. |
| $C_6H_5$ | $C_2H_5$ | n—$C_3H_7$ | $C_6H_5$ | 150–160° C./0.4 mm. Hg. |
| $C_6H_5$ | $C_2H_5$ | n—$C_4H_9$ | $C_6H_5$ | 165–176° C./0.4 mm. Hg. |
| $C_6H_5$ | $C_2H_5$ | $C_6H_5CH_2$— | $C_6H_5$ | 210–220° C./0.6 mm. Hg. |
| $C_6H_5$ | $C_2H_5$ | i—$C_3H_7$ | $C_6H_5$ | 170–180° C./0.2 mm. Hg. |

*Example 34.—1,2-diphenyl-4,4-diethyl-3-pyrazolidinone*

In 100 ml. of anhydrous pyridine 18.4 g. of hydrazobenzene are dissolved under an atmosphere of inert gas, then 22.4 g. of α,α-diethyl-β-bromopropionyl chloride are added at 0° C.

The mixture is heated at 100° C. for 2 hours to complete reaction, then it is cooled, filtered and evaporated in vacuo. The residue is taken up with ethyl ether, treated with an ether solution of HCl and filtered.

The ether solution is washed with $H_2O$, dilute NaOH and again with $H_2O$, then it is dried over $Na_2SO_4$. The oily residue obtained after evaporation of the solvent is distilled at 170–180° C./0.2 mm. Hg. The distillate is chromatographed on alumina, then diluted with petroleum ether, petroleum ether-benzene (1:2), and finally with benzene. The third fraction (in benzene) is formed by practically pure 1,2-diphenyl-4,4-diethyl-3-pyrazolidinone, M.P. 99–100° C.

Examples 35–36

Substantially as described in the preceding examples the following compounds were prepared:

| R | $R_1$ | $R_2$ | $R_3$ | M.P. or B.P. |
|---|---|---|---|---|
| $C_6H_5$ | $CH_3$ | $C_6H_5$ | $C_6H_5$ | 190–195° C./0.2 mm. Hg. |
| $C_6H_5$ | $C_6H_5$ | $C_6H_5$ | $C_6H_5$ | 144–146° C. |

We claim:

1. A compound of the formula

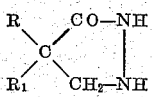

wherein R indicates a member of the class consisting of lower alkyl, phenyl and phenyl-lower alkyl; and $R_1$ is a member of the class consisting of lower alkyl having at least 2 carbon atoms, phenyl, and phenyl-lower alkyl.

2. 4-phenyl-4-butyl-3-pyrazolidinone.
3. 4-phenyl-4-benzyl-3-pyrazolidinone.
4. 4,4-diethyl-3-pyrazolidinone.

References Cited by the Examiner

UNITED STATES PATENTS

| | | | |
|---|---|---|---|
| 2,212,056 | 8/40 | Tinker et al. | 260—515 |
| 2,289,367 | 7/42 | Kendall | 260—310 |
| 2,449,163 | 9/48 | Ford | 260—539 |
| 2,449,993 | 9/48 | Gresham et al. | 260—539 |
| 2,497,673 | 2/50 | Kirk | 260—515 |
| 2,533,134 | 12/50 | McBee et al. | 260—539 |
| 2,636,816 | 4/53 | Stewart | 71—2.7 |
| 2,688,024 | 8/54 | Kendall et al. | 260—310 |
| 2,726,248 | 12/55 | Kendall et al. | 260—310 |
| 2,739,153 | 3/56 | Williams | 260—310 |
| 2,772,282 | 11/56 | Allen et al. | 260—310 |
| 2,877,182 | 3/59 | May | 252—49.6 |

OTHER REFERENCES

Zaugg et al.: Jour. American Chem. Soc., volume 72, pages 3004–7 (1950).

Nerdel et al., Chem. Berichte, volume 92, pages 1329–35 (1959).

Burger, Medicinal Chemistry, 2nd Ed., pp. 341–44, N.Y., Interscience, 1960.

Conant et al., The Chemistry of Organic Compounds, 3rd Ed., p. 240, N.Y., MacMillan, 1947.

Nicolaus et al., Helvetica Chimica Acta, vol. 44, pp. 2059–79 (Sept. 1, 1961).

Royals, Advanced Organic Chemistry, pp. 605 and 610–11, Englewood Cliffs, Prentice-Hall, 1954.

IRVING MARCUS, *Primary Examiner.*

NICHOLAS S. RIZZO, *Examiner.*